United States Patent [19]
Peeters

[11] Patent Number: 5,540,040
[45] Date of Patent: Jul. 30, 1996

[54] FOLDING HAY RAKE

[75] Inventor: Kenneth J. Peeters, Bear Creek, Wis.

[73] Assignee: H&S Manfacturing Co., Inc., Marshfield, Wis.

[21] Appl. No.: 397,427

[22] Filed: Mar. 1, 1995

[51] Int. Cl.⁶ .................................................. A01D 78/14
[52] U.S. Cl. ................................................. 56/377; 56/385
[58] Field of Search ........................... 56/377, 367, 372, 56/380, 384, 385

[56] References Cited

U.S. PATENT DOCUMENTS

| | | |
|---|---|---|
| 2,658,324 | 10/1953 | Johnson . |
| 2,925,702 | 2/1960 | Plant . |
| 2,982,081 | 5/1961 | Cooley . |
| 3,108,424 | 10/1963 | van der Lely et al. . |
| 3,466,860 | 9/1969 | Winket et al. . |
| 3,667,200 | 6/1972 | Pool et al. . |
| 4,040,490 | 8/1977 | Anderson . |
| 4,078,366 | 3/1978 | Carmichael . |
| 4,183,198 | 1/1980 | Sligter . |
| 4,245,458 | 1/1981 | Smith . |
| 4,315,546 | 2/1982 | Fahrenholz . |
| 4,496,003 | 1/1985 | Bynum . |
| 4,723,401 | 2/1988 | Webster et al. . |
| 4,723,403 | 2/1988 | Webster ............................... 56/208 X |
| 4,753,063 | 6/1988 | Buck . |
| 4,932,197 | 6/1990 | Allen . |
| 4,947,631 | 8/1990 | Kuehn . |
| 4,974,407 | 12/1990 | Rowe et al. . |
| 5,062,260 | 11/1921 | Tonutti ................................... 56/380 |
| 5,065,570 | 11/1991 | Kuehn . |
| 5,199,252 | 4/1993 | Peeters ............................... 56/384 X |
| 5,305,590 | 4/1994 | Peeters ................................... 56/377 |

OTHER PUBLICATIONS

"Vicon" Brochure, Crop–driven fingerwheel rakes, Date Unknown.

Primary Examiner—Terry Lee Melius
Attorney, Agent, or Firm—Patterson & Keough, P.A.

[57] ABSTRACT

A deployment spreader with two arms and an elbow member arrangement, optionally and preferably having a locking mechanism involving an overcenter arrangement of certain pivots, for deployment or retraction of a folding hay rake which is towable by a tractor. The hayrake rake has a primary towable frame with right and left secondary frames pivotally attached adjacent the rear of the primary frame. The deployment spreader assembly is pivotally attached to the primary and secondary frames for pivoting the secondary frame relative to the primary frame.

5 Claims, 8 Drawing Sheets

FOLDING HAY RAKE

BACKGROUND OF THE INVENTION

The present invention relates to agricultural implements and, in particular, the present invention relates to towable folding wheel rakes useful to form windrows from cut forage.

For many years it has been a typical agricultural process to cut forage, allow some drying to occur, rake it into piles where some additional drying occurs, collect and store it at a desirable moisture content, and subsequently feed such stored, dried forage to livestock. Weather conditions between the time of cutting and collecting play a major role in determining the resulting quality of the product of this agricultural process. In modern times, as farms have grown dramatically in area and the work force reduced in number, the process has been altered to employ power equipment to rake the drying cut forage into long, continuous windrows, which also encourages drying. The windrows may or may not be formed into bales prior to collection. Weather continues to be a major determinant of the overall outcome and the capability to rapidly rake a large field area in a short time is often critical.

Most modern power equipment for raking cut forage employs rotating tined wheels and most particularly banks of rotating tined wheels which are moved through a field of cut forage to form windrows. These banks of wheel rakes and more importantly multiple banks of wheel rakes can be quite wide to reduce both the time and pathway required to rake a field. Wide rakes thereby offer a potential time and cost savings to agriculture and enhance the opportunity to perform the raking process so as to best utilize favorable weather conditions.

In designing agricultural implements, such as wide hay rakes, relatively minimal frame members sizes are preferred over massive frame members to avoid increased manufacturing cost and increased implement weight. A more expensive implement which requires more fuel input to a larger tow vehicle for operation due to increased weight would sacrifice some of the potential efficiency of wide rakes.

An additional engineering challenge concerns the transport of wide rakes between fields. In response to the transport challenge, wide rakes which fold to facilitate transport over highways and through fence gates have become popular in recent years. Peeters in U.S. Pat. Nos. 5,199,252 and 5,305,590 discloses an exemplary folding hay rake. The Peeters rake involves a towable primary transport frame with right and left secondary frames, each having a bank of wheel rakes, pivotally deployed from the rear end of the primary frame by action of a telescoping extension assembly.

Practical and economical pivoting of the secondary frames relative to the primary frame can represent a considerable engineering challenge. The telescoping extension approach of Peeters requires either a very long hydraulic cylinder and ram attached well away from the pivot connection between the primary and secondary frames, or in the alternative, a short, very powerful cylinder and ram, situated close to the pivot connection between the primary and secondary frame.

Each of these two telescopic deployment approaches have certain disadvantages. A long hydraulic cylinder and ram are subject to vibration which might damage relatively thin hydraulic components. Therefore, long hydraulic components must be of a sufficient diameter, often greater than required for mere deployment, in order to withstand the jarring and shock encountered in raking a hay field. Such long and large hydraulic units tend to be relatively heavy and expensive, both undesirable qualities in a folding hay rake. Even short, powerful hydraulic units, mounted near the frame pivot, require heavy mounts and heavier, more massive primary and secondary frames to transmit the hydraulically imparted motion to the end of the secondary frame and its supporting caster wheel. Again, this solution tends away from the desirable objectives of light weight and low capital cost for a folding hay rake.

The present invention provides an ingenious solution to pivotally extending or retracting a secondary frame on a folding wheel rake, while avoiding the above mentioned long or short hydraulic telescopic deployment systems. The present invention is compatible with the use of relatively fine frame members on the agricultural implement, which tends to minimize the implement's weight and does not result in excessive increases in manufacturing costs. The agricultural implement of this invention therefore allows better exploitation of the potential efficiency of a wide folding wheel rake. Further, other aspects of the present invention provide versatility and fine adjustments in forage raking operations.

SUMMARY OF THE INVENTION

The present invention involves a clever arrangement for deploying a wide folding hay rake through the use of a deployment spreader with two arms and an elbow member arrangement. In a most preferred embodiment, the deployment spreader incorporates a locking mechanism involving an overcenter arrangement of certain pivots.

The present invention, in a first embodiment, is a folding hay rake which is towable by a tractor when raking a field or a truck when being transported. The rake includes a primary or central frame with a forward end and a rear end. A secondary frame, preferably a right secondary frame and a left secondary frame, is pivotally attached to the primary frame adjacent the rear end. The secondary frame, or frames, is extended or deployed from the transport position and retracted again by a deployment spreader assembly. The deployment spreader assembly is pivotally attached to the primary and secondary frames for pivoting the secondary frame relative to the primary frame. The deployment spreader assembly includes a first arm and a second arm pivotally connected to the first arm, as well as an elbow member. The elbow member is slidably and pivotally attached to the first arm and pivotally attached to the second arm. When pivoted, the elbow member causes the first and second arms to pivot relative to each other. By such motion, the deployment spreader assembly extends or deploys to a condition where the arms are generally co-aligned, or in the alternative, retracts to a condition where the arms are generally parallel to each other. The elbow member is preferably pivoted by hydraulic force, most preferably a ram and cylinder extending from a free end of the elbow member to a location spaced apart from the pivot connecting the two arms. Preferably, a separate deployment spreader assembly is provided for right and left secondary frames. Most preferably, the deployment spreader assembly has an overcenter geometry, generated when the arms are co-aligned, with respect to three pivots; specifically, the pivot between the two arms, the pivot connecting the elbow member to the second arm, and the sliding pivot connecting the elbow member to the first arm. This overcenter condition or geometry acts as a lock to prevent pivoting between the first and second arms when they are coaligned.

Preferably, a folding hay rake of the present invention, includes a plurality of selectable pivot attachments between the deployment spreader assembly and the secondary frames. The selectable pivot attachments allow adjustment of the angle between the secondary frame and the primary frame, even while the lock-like overcenter geometry arrangement of the two arms is present.

In another preferred embodiment, the present invention is a deployment spreader assembly, which can be attached on each end to a pair of pivot points. When attached, it can move the pair of pivot points apart or together. Preferably, the pivot points to be moved follow a defined path, and most preferably, the deployment spreader assembly of the present invention locks when fully extended by assuming an overcenter geometric condition of three pivot points. Most preferably, the deployment spreader assembly of the present invention is hydraulically driven to extend or retract.

DETAILED DESCRIPTION OF THE DRAWINGS

Comprehension of the present invention can be gained through reference to the drawings in conjunction with a thorough review of the following explanation. In order to facilitate a full appreciation of the invention, an overview of the preferred embodiment is initially provided. The overview is followed by more detailed explanation. By "forage" herein is meant not only food for livestock such as horses and cattle, such as hay, but also similar materials, such as straw, which might be used for bedding rather than food. By "overcenter" herein is meant a condition in which three pivots are moved into a geometric linear alignment with each other and then proceed slightly past the geometric linear alignment condition.

Overview of the Agricultural Implement

Figures 1, 2:
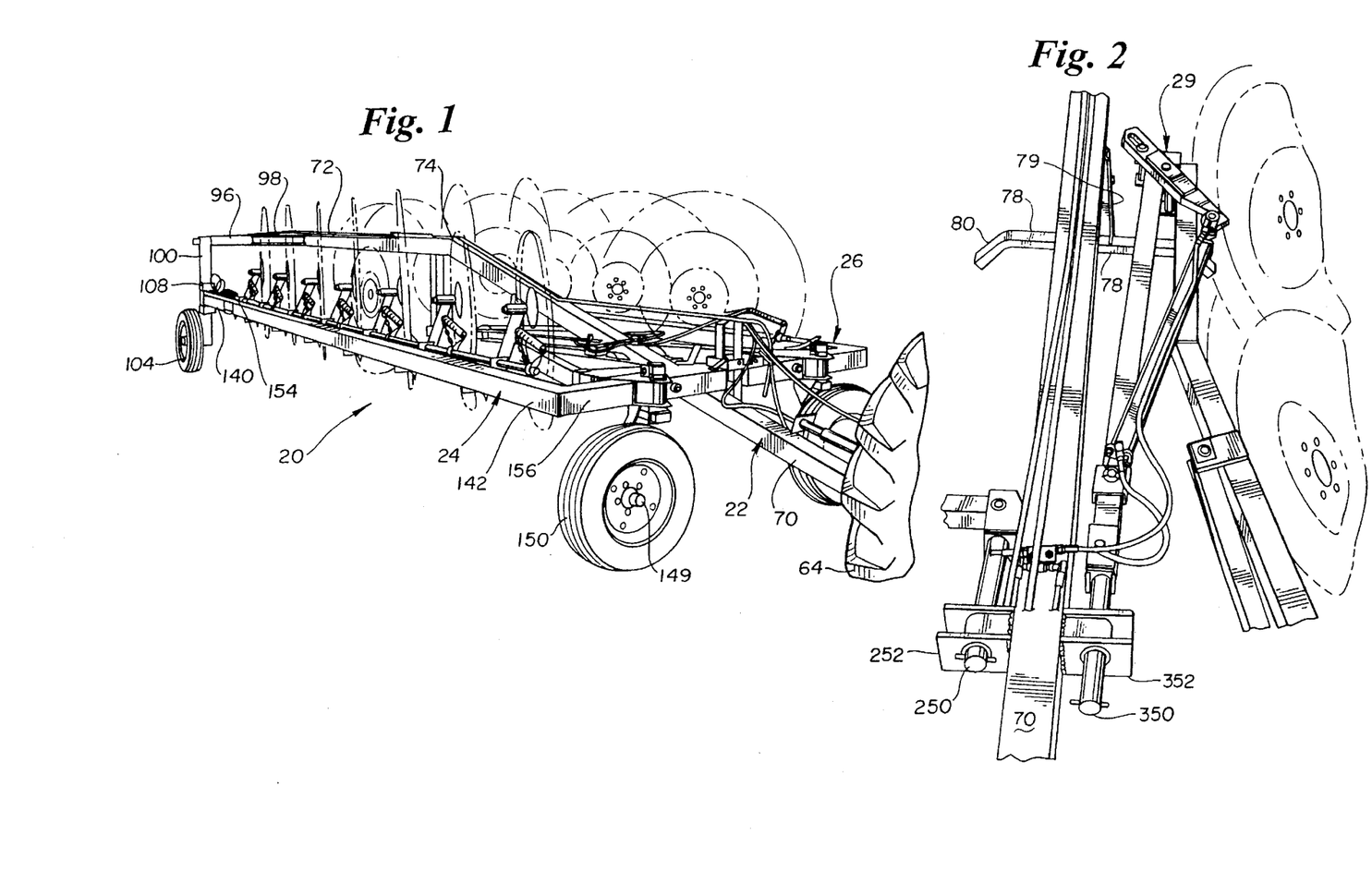
FIG. 1 is a perspective view of a folding hayrake of the present invention in transport position and attached to a tractor.
FIG. 2 is detailed fragmentary perspective view thereof, as viewed from an elevated location above the front.
Figure 3:
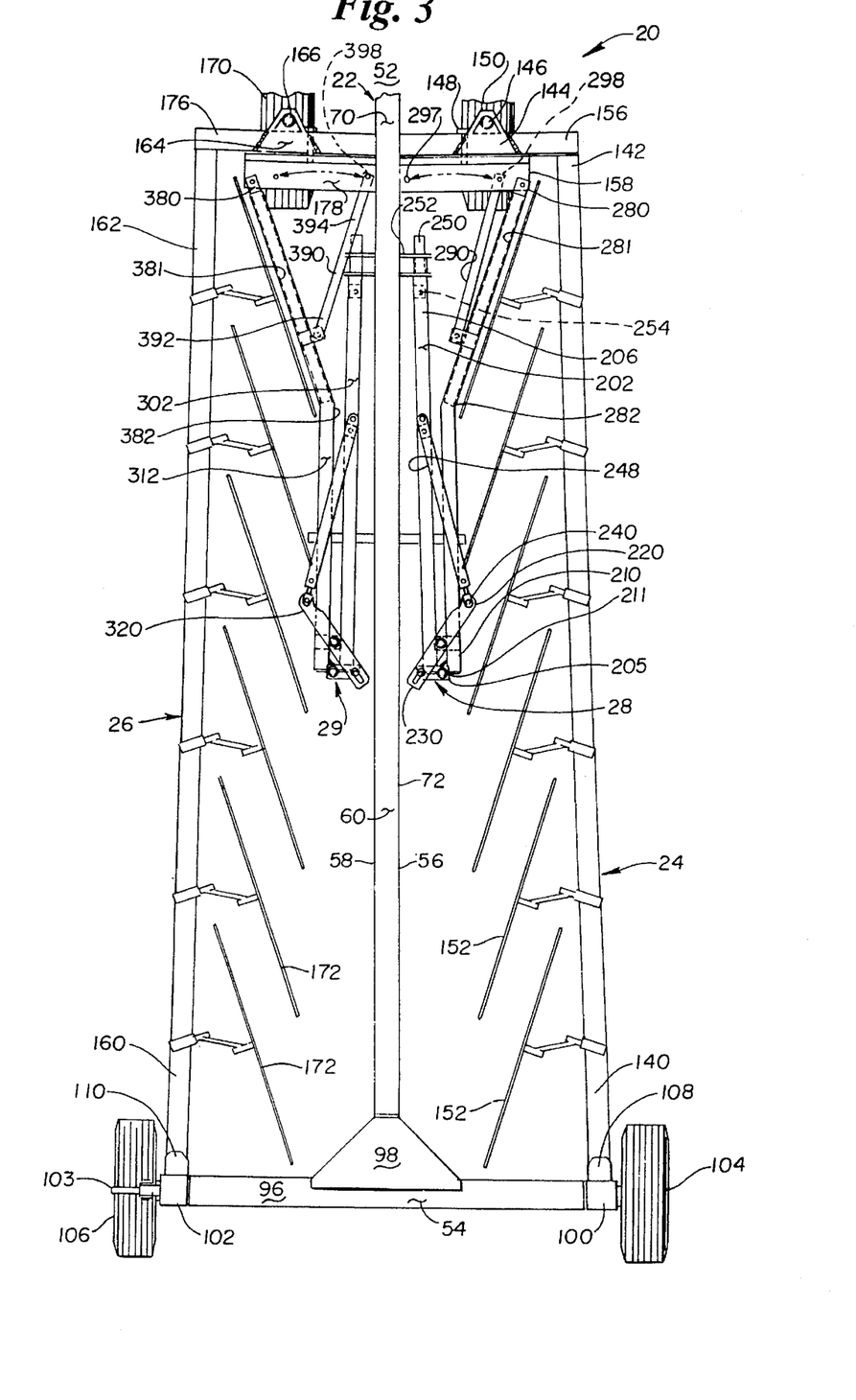
FIG. 3 is a fragmentary top plan view thereof, having some parts shown in simplified form, and showing the rake in transport position in preparation for wide left side deployment and narrow right side deployment, respectively.
Figure 7:
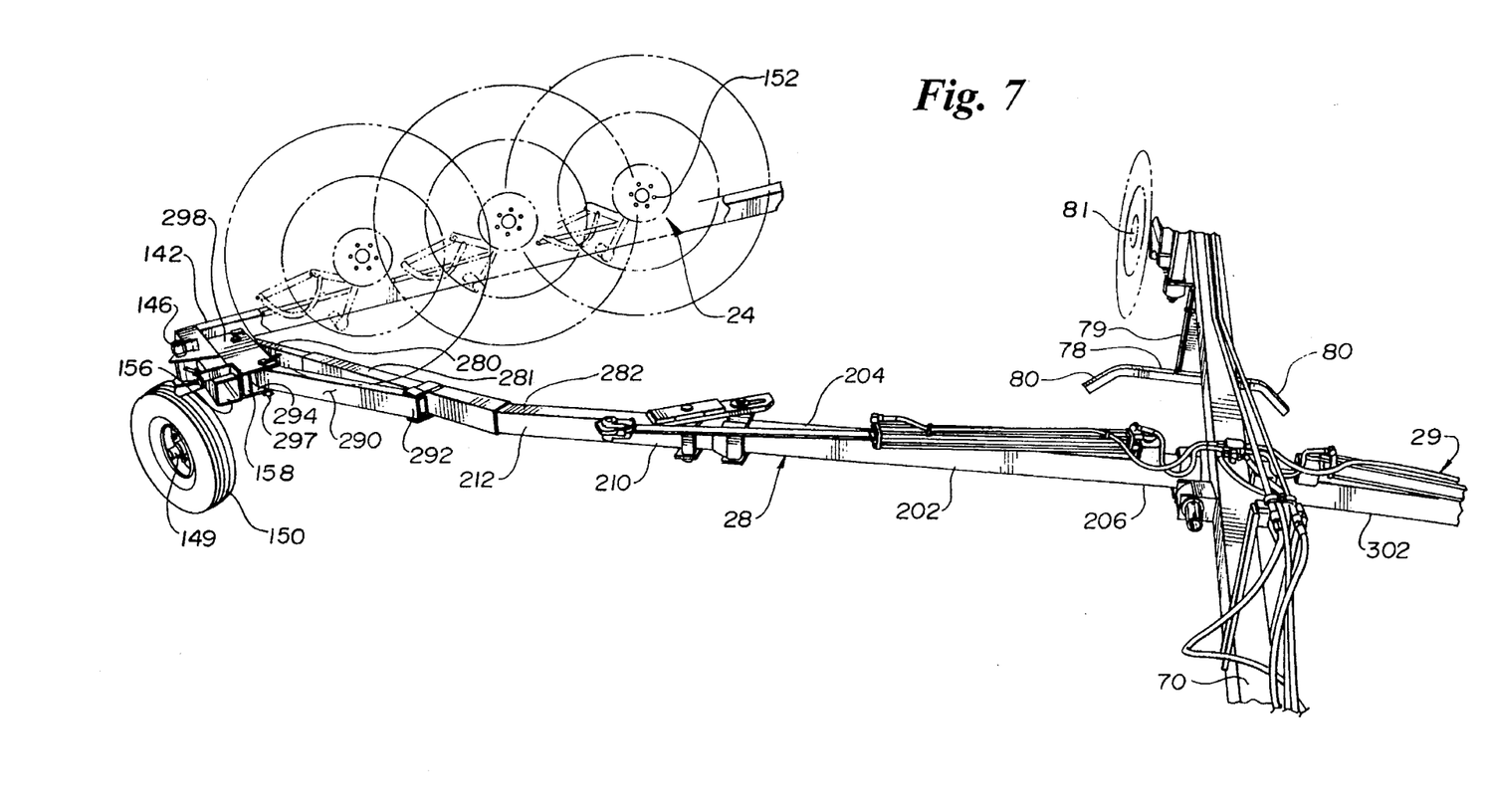
FIG. 7 is a fragmentary perspective view of the rake seen from the front and showing the right side in wide deployment.
Figure 14:
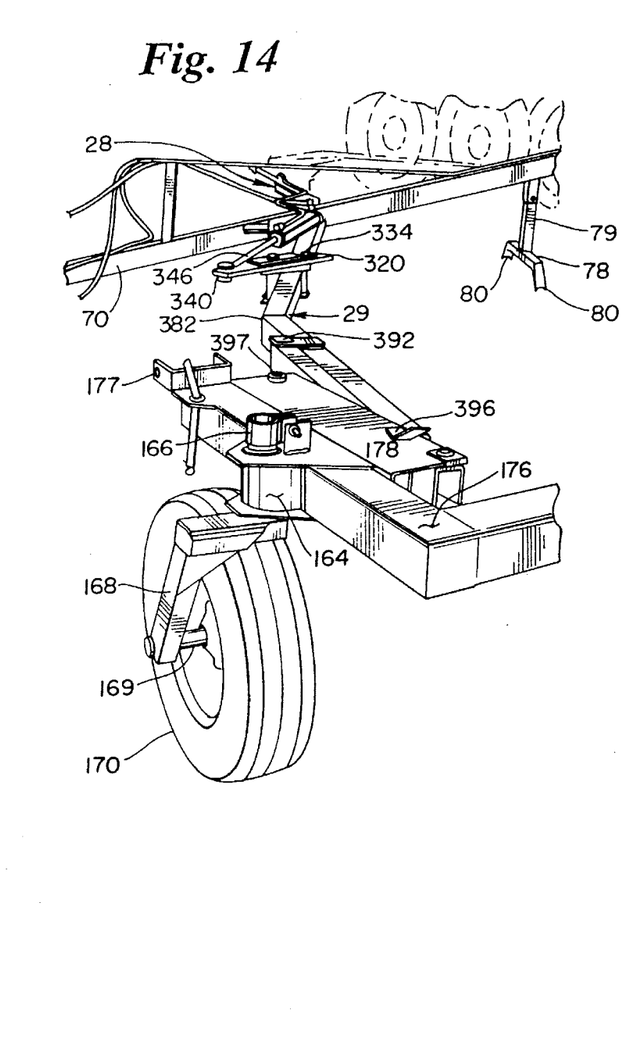
FIG. 14 is a fragmentary perspective view of the deployed rake seen from outside the left end of the left deployment spreader and viewing the rake with a line of sight above and along the left and the right spreaders.

In a preferred embodiment, a folding hayrake of the present agricultural implement invention is depicted in FIG. 1 at 20. The hayrake 20 includes a primary frame 22, a right secondary frame 24, and a left secondary frame 26. The secondary frames 24 and 26 may each occupy a transport position or retracted relationship relative to the primary frame 22, as depicted in FIGS. 1, 2, and 3. Alternatively, the secondary frames 24 and 26 may also each occupy deployed positions or relationships relative to the primary frame 22, as depicted in FIGS. 7 and 14. Pivotal motion to deploy and retract the secondary frames 24 and 26 relative to the primary frame 22 is imparted by right and left deployment spreader assemblies 28 and 29, respectively.

Primary Frame

The primary frame 22, as depicted in FIG. 3, has a front end 52, a rear end 54, a right side 56, a left side 58, a top side 60, and a bottom side (opposite the top side 60.) At the front end 52, a typical agricultural hitch (i.e. top and bottom spaced apart leaves with co-aligned apertures) provides reversible attachment of the implement 20 to a towing vehicle 64. Preferably, the tow vehicle 64 has a compatible draw bar with an appropriate aperture to accept a hitch pin when interposed in the hitch. Most preferably, when the implement 20 is to be operated, the tow vehicle 64 is a farm tractor or equivalent device with the additional capability to provide quick connections to the intake and outlet of a hydraulic fluid pressuring system, as much of the implement 20 is preferably hydraulically operated. However, it should be noted that for transport, in the retracted position, the implement 20 may be towed by light duty trucks lacking such hydraulic systems, and may travel on smooth highways at rates of speed up to roughly 50 miles per hour. The hitch is attached to a tongue 70 which ascends gradually rearward from the relatively low elevation of the hitch and the draw bar of tow vehicle 64 to an elevation roughly chest high and connects to the front end of a tubular spine 72 through a bend 74.

The elevation of the spine 72 is significant for avoiding interference and potential trapping of cut forage during high speed (about 15 miles per hour) raking operations. The spine 72 extends horizontally rearward from the bend 74.

Figure 4:
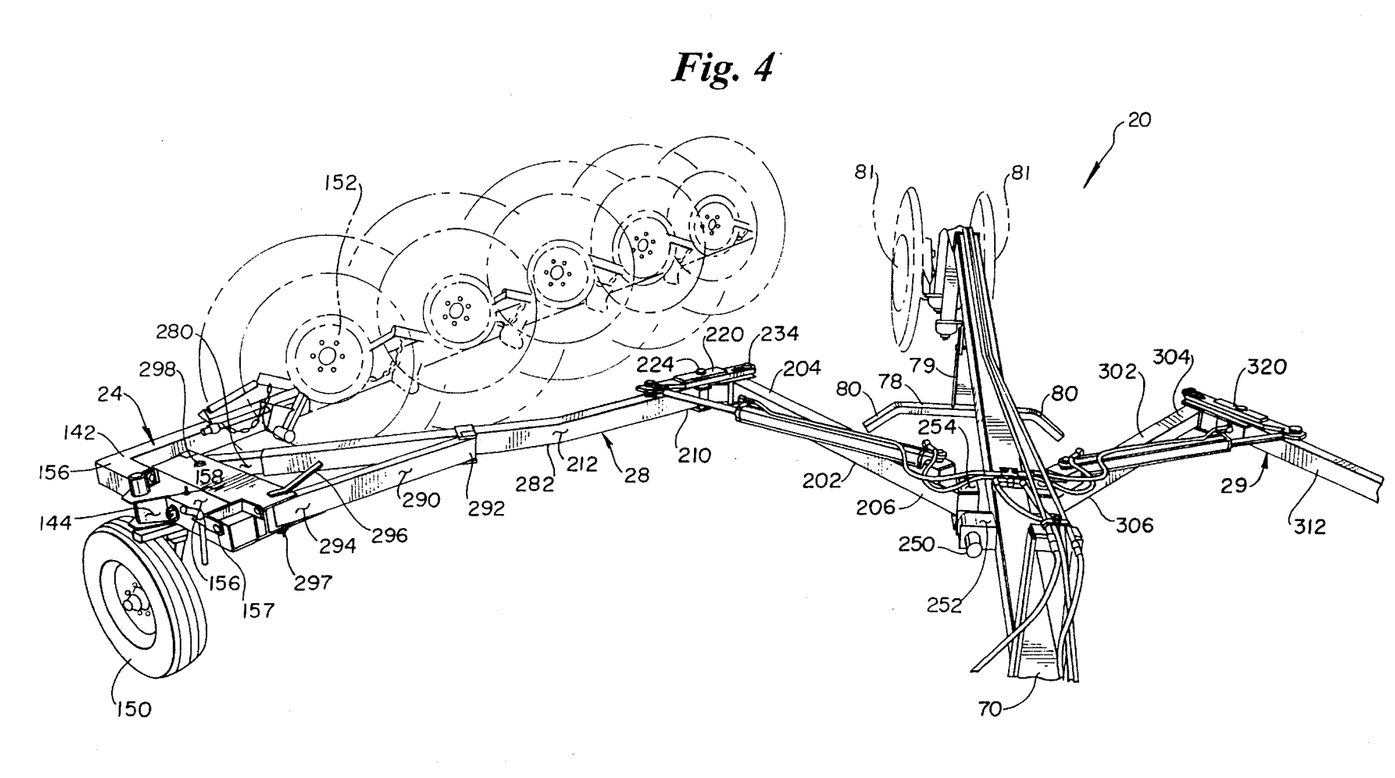
FIG. 4 is a fragmentary perspective view thereof, as seen from in front and above, and showing the right side of the rake in a partially deployed or intermediate position.

A transport bracket 78 is transversely mounted on the lower end of a bracket 79 depending from the tongue 70, at a location between the bend 74 and the hitch. The transport bracket 78 serves to slidably support the deployment spreader assembly 28 when the rake 20 is in the transport position, as shown in FIG. 3. Such support eliminates a potentially detrimental cantilevered condition and much of the associated potential stress and strain on connections of the deployment spreader assembly 28 to the primary and secondary frames 22, 24, and 26. As shown in FIGS. 4 and 14, at the outboard ends of the transport bracket 78 are down-turned ends or ramps 80 which serve to intercept and slightly raise a central portion of the deployment spreader assembly 28 as the travel position is attained. When deployment begins, the supported central portion of the deployment spreader assembly 28 slides outward or outboard on the transport bracket 78 and away from the primary frame 22 and then subsequently slides down the ramp 80. Without the ramp 80, the deployment spreader 28 would drop suddenly during deployment and would be unable to dependably re-attain the support position upon the transport bracket 78 on retraction to the transport position.

Continuing the description of the primary frame 22 in a rearward direction, a center rake mechanism 81 may optionally be provided to initially rake cut forage from the pathway which is the eventual location of the windrow. The spine 72 is connected to a crosstree 96 and that connection is strengthened by permanent attachment (i.e. welding) of both the spine 72 and the crosstree 96 to bottom gusset 97 and top gusset 98.

The crosstree 96, in turn, is supported by right post 100 and left post 102. Outboard and at the bottom of each of the posts 100 and 102 are right and left rear wheels 104 and 106, respectively. Optionally, the spacing between the wheels 104 and 106 is adjustable, by means of a handcrank 103 driving a double threaded screw mechanism internal to the cross tree 96. These two wheels 104 and 106 are mounted on fixed axles, projecting outboard from the posts 100 and 102, and are oriented for forward travel of the implement 20. In an alternative embodiment, for particularly large rakes, right and left multiwheel assemblies can be employed instead of single right and left wheels to support larger primary frames, to reduce soil compaction, and/or provide additional or enhanced capability to travel over soft or sandy soils. On the forward side of each of the posts 100 and 102, intermediate the crosstree 96 and the respective wheels 104 and 106, are right and left vertical hinges 108 and 110, respectively. These vertical hinges 108 and 110 connect to and carry right and left secondary frames 24 and 26, respectively.

Right Secondary Frame

The right secondary frame 24 has an inboard end 140, connected to the right vertical hinge 108. A right bank of wheel rakes 152, preferably ground driven wheel rakes, is carried by the right secondary frame 24. When lowered into appropriate ground tension contact, each of the rakes of the right bank of wheel rakes 152 rake and rotate such that cut forage lying on the ground is raked toward the primary frame 22. In concert, as the bank of wheel rakes 152 simultaneously rotate and are towed forward, most cut forage encountered is raked into a windrow passing between the right rear wheel 104 and the left rear wheel 106. Further, the right bank of wheel rakes 152 may be raised or lowered relative to the right secondary frame 24 by a hydraulically powered rake actuator assembly 154. Banks of wheel rakes on secondary frames which may be raised and lowered, preferably hydraulically, are known in this art and the disclosures of U.S. Pat. Nos. 5,199,252 and 5,305,590, to Peeters, are incorporated herein by reference.

At an end of the right secondary frame 24, opposite from the inboard end 140, is the outboard end 142 and an outboard end frame 156 which is rigidly connected generally perpendicular to the outboard end 142 of the right secondary frame 24. The outboard end frame 156 projects inboard, with reference to the transport position, or ahead, with reference to the deployed position, from the right secondary frame 24. A right transport link bracket 157, at the inboard terminus of the right outboard end frame 156 can reversibly accept a pin to reversibly link the both right and left secondary frames 24 and 26 to the primary frame 22 during transport. Storage is provided for the pin adjacent the right transport link bracket when the pin is removed from the right transport link bracket and the implement 20 is deployed for use. On the front or outboard side of the outboard end frame 156 is a pivot bracket 144, housing a vertical pivot 146 atop a raked fork 148, a horizontal axle 149 and a right outboard wheel 150, which is free to caster or serve as an orbital idler wheel. In an alternative embodiment, multiwheel assemblies may be substituted for a single castered wheel and, moreover, additional castered wheels may also be provided at intermediate locations along longer secondary frames. The wheel 150 is self steering and supports the outboard end frame 156 and, in turn, the outboard end 142 of the right secondary frame 24.

Pivotally mounted at an intermediate position on the inboard or rearward side of the right outboard end frame 156 is a right connector frame 158 which connects to the right deployment spreader assembly 28. The right connector frame 158 can pivot about a horizontal pivot axis situated at an intermediate point on the connector frame 158.

Left Secondary Frame

The left secondary frame 26 is generally a mirror image of the right secondary frame 24 and has an inboard end 160, connected to the left vertical hinge 110. A left bank of wheel rakes 172, preferably ground driven wheel rakes, is carried by the left secondary frame 26. When lowered into appropriate ground tension contact, each of the rakes of the left bank of wheel rakes 172 rake and rotate such that cut forage lying on the ground is raked toward the primary frame 22. In concert, as the bank of wheel rakes 172 simultaneously rotate and are towed forward, most cut forage encountered is raked into a windrow passing between the right rear wheel 104 and the left rear wheel 106. Further, the left bank of wheel rakes 172 may be raised or lowered relative to the left secondary frame 26 by a hydraulically powered rake actuator assembly 155. Banks of wheel rakes on secondary frames which may be raised and lowered, preferably hydraulically, are known in this art and the disclosures of U.S. Pat. Nos. 5,199,252 and 5,305,509, to Peeters, as mentioned previously, are incorporated herein by reference.

At an end of the left secondary frame 26, opposite from the inboard end 160, is the left outboard end 162 and a left outboard end frame 176 which is rigidly connected generally perpendicular to the outboard end 162 of the left secondary frame 26. The outboard end frame 176 projects inboard, with reference to the transport position, or ahead, with reference to the deployed position, from the left secondary frame 26. A left transport link bracket 177, at the inboard terminus of the left out outboard frame 176 provides, a reversible pin connection to the right transport link bracket 177 and the primary frame 22 during transport. A storage location for the pin is provided adjacent the link bracket 177 when the pin is not in use. On the front or outboard side of the outboard end frame 176 is a pivot bracket 164, housing a vertical pivot 166 atop a raked fork 168, a horizontal axle 169 and a left outboard wheel 170, which, like right outboard wheel 150, is free to caster or serve as an orbital idler wheel. As mentioned earlier, in an alternative embodiment, multiwheel assemblies may be substituted for a single castered wheel and, moreover, additional castered wheels may also be provided at intermediate locations along longer secondary frames. In such alternative embodiments, a mirror image arrangement is envisioned as preferable, but not absolutely required, in order to benefit from the present invention. The left outboard wheel 170 is self steering and supports the left outboard frame 176 and, in turn, the left outboard end 162 of the left secondary frame 26.

Pivotally mounted at an intermediate position on the inboard or rearward side of the outboard end frame 176 is a left connector frame 178 which connects to the left deployment spreader assembly 29. The left connector frame 178 can pivot about a horizontal pivot axis situated at an intermediate point on the connector frame 178.

Deployment Spreader Assemblies

The right deployment spreader assembly 28 includes a first or inboard arm 202 having a first end 204 and a second end 206. The first end 204 of the inboard arm 202 has a tab 205 which is pivotally attached to a tab 211 at the first end 210 of a second or outboard arm 212 at a first vertical pivot 214. An elbow member 220 is also pivotally attached to a second tab 222 on the outboard arm 212 through a second vertical pivot 224. The second tab 222 is spaced longitudinally apart from the first tab 211 at the first end 210 of the outboard arm 212. The second vertical pivot is situated at an intermediate point on the elbow member 220. At a first end 230 of the elbow member 220 is a slot 232 extending generally longitudinally on the elbow member 220. Captured in the slot 232 is a lug 234 projecting vertically and upward from adjacent the first end 204 of the inboard arm 202. Lug 234 moves longitudinally, with respect to the elbow member 220, within slot 232 as the deployment spreader assembly 28 operates.

Figure 5:
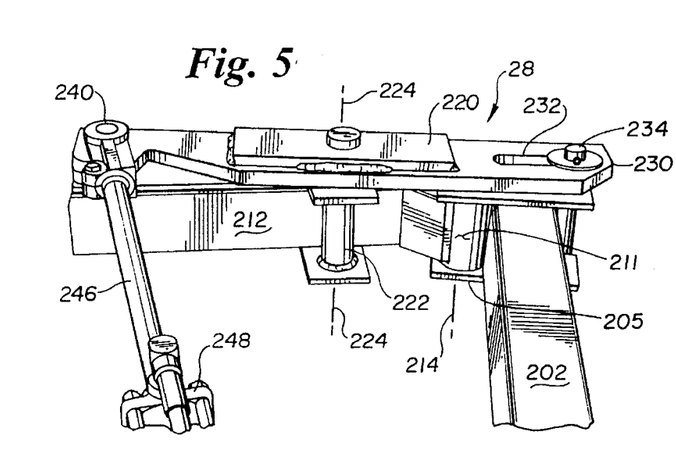
FIG. 5 is an enlarged detail perspective view of the subject of FIG. 4 seen from the front.
Figure 6:
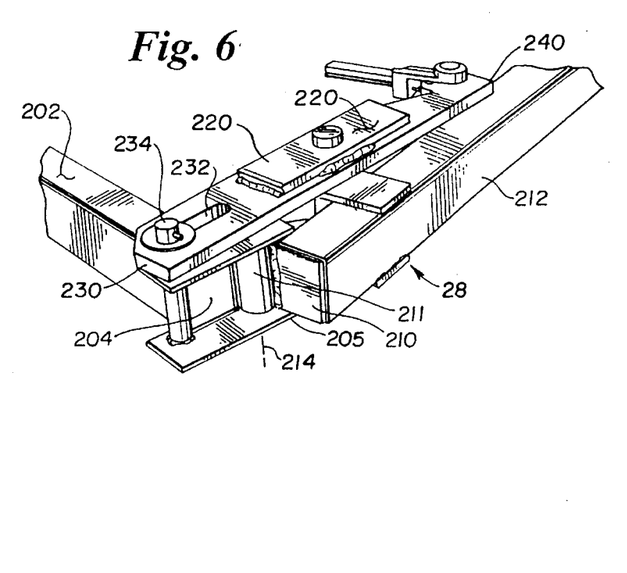
FIG. 6 is an enlarged detail perspective view of the subject of FIG. 4 seen from the rear.

When the inboard arm 202 and the outboard arm 212 are positioned generally parallel to each other, as when the right secondary frame 24 of rake 20 is in the transport position, the lug 234 resides within the slot 232 at a location toward second pivot 224. When, as shown in FIGS. 4, 5, and 6, the inboard arm 202 and outboard arm 212 are positioned at roughly right angles to each other, as when the right secondary frame is in transition, half way toward being deployed or retracted, the lug 234 is positioned within the slot 232 closer to the first end 230 of the elbow member 220. When the inboard arm 202 and outboard arm 212 are positioned in a roughly co-linear relationship to each other, as shown in FIGS. 7, 8, 9 and 10, when the right secondary frame is fully deployed, the lug 234 is positioned within the slot 232 closer to the second pivot 224 than to the first end 230 of the elbow member 220.

Figure 8:
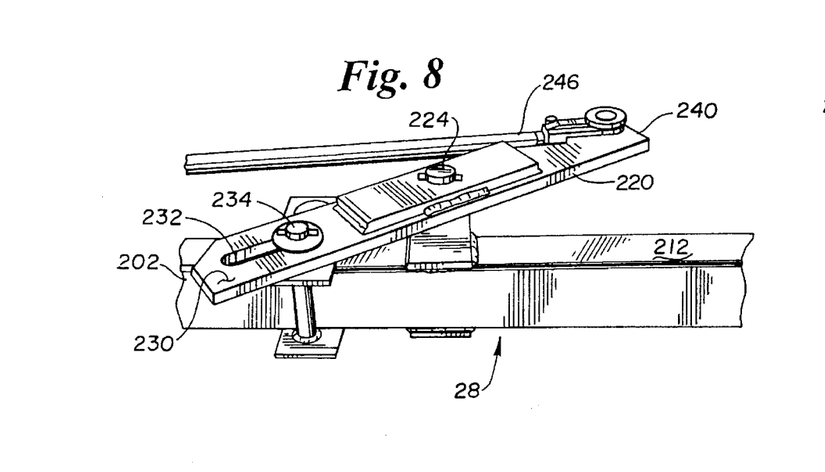
FIG. 8 is an enlarged detail perspective view of the subject of FIG. 7 as seen from the rear.
Figure 9:
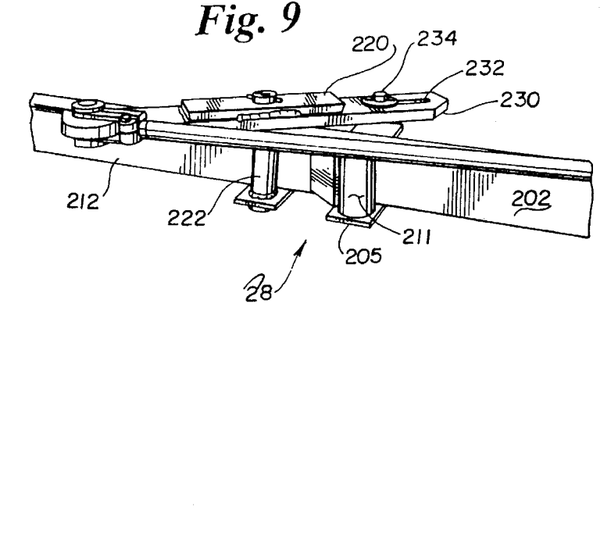
FIG. 9 is an enlarged detail perspective view of the subject of FIG. 7 as seen from the front.
Figure 10:
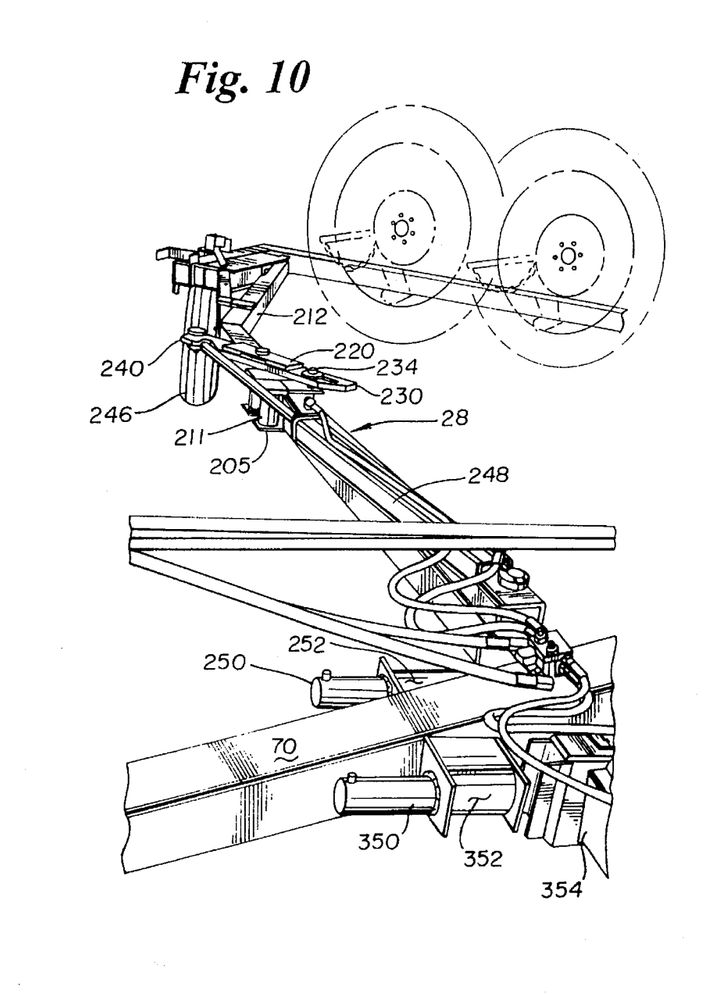
FIG. 10 is a fragmentary perspective view of the rake showing the right side in wide deployment and viewed from just to left of the primary frame.

The opposite end 240 of the elbow member 220 is pivotally connected to the terminal clevis of a hydraulic ram 246 driven by a hydraulic cylinder 248 which in turn is pivotally attached at an intermediate point 250 on the inboard arm 202. From an initial retracted position, as depicted in FIGS. 2 and 3, hydraulic extension of the ram 246 from the cylinder 248 moves the end 240 of the elbow member 230, forcing the outboard arm 212 to pivot about the first vertical pivot 214. During this initial motion, the end 240 of the elbow member 220 is angularly disposed to and situated slightly outboard from the outboard arm 212. As the extension motion continues, the end 240 of the elbow member 220 moves outboard and reorients slightly, while the outboard arm 212 beneath it moves outboard and reorients significantly, such that it becomes temporarily parallel to the elbow member 220, as shown in FIGS. 4, 5, and 6. As the extension motion is completed, the outboard arm 212 moves from generally parallel to a new angular relationship with the elbow member 220. Finally, with the outboard arm 212 generally coaligned with the inboard arm 202, the end 240 of the elbow member 220 resides in front of the outboard arm 212 and further extension of the hydraulic ram and cylinder tends to be limited by abutment of the ends 204 and 210 of the arms 202 and 212 near the first pivot 214, as shown in FIGS. 8, 9 and 10. In effect, the elbow member 230 tends to lock the inboard arm 202 and the outboard arm 212 in a generally co-aligned and fully extended relationship, corresponding to a fully deployed right secondary frame 24.

This locking capability is due to a near linear geometry, including a slight overcenter relationship, between the first pivot 214, the second pivot 224 and the lug 234 within slot 232. Another significant feature of the deployment spreader assembly 28 is the relatively short travel (i.e. extension or retraction) needed between the hydraulic ram and cylinder 246 and 248 respectively. This feature saves both manufacturing cost and operating cost in reducing the weight of rake 20.

Figure 11:
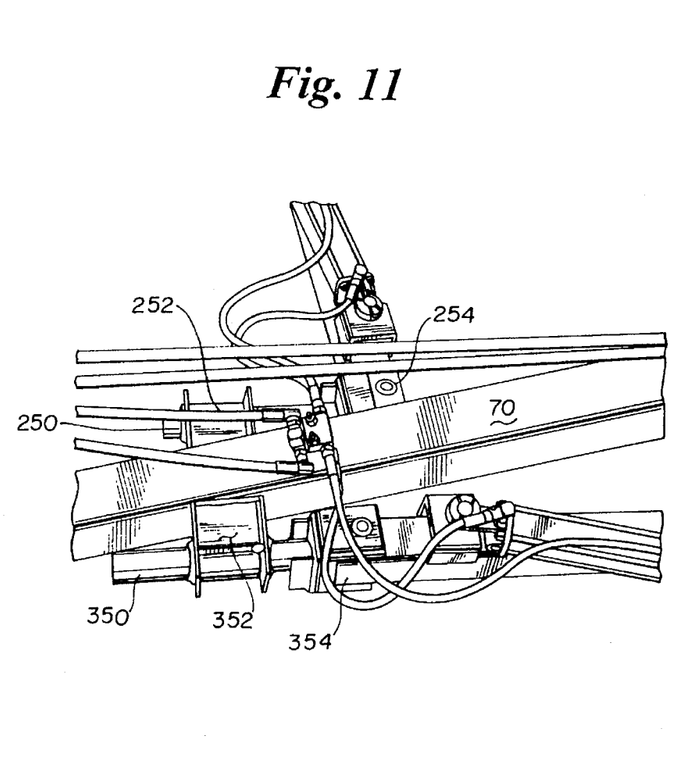
FIG. 11 is a fragmentary detail perspective view showing right and left self-aligning articulated pivot assemblies for the right and left deployment spreaders on the primary frame.
Figure 12:
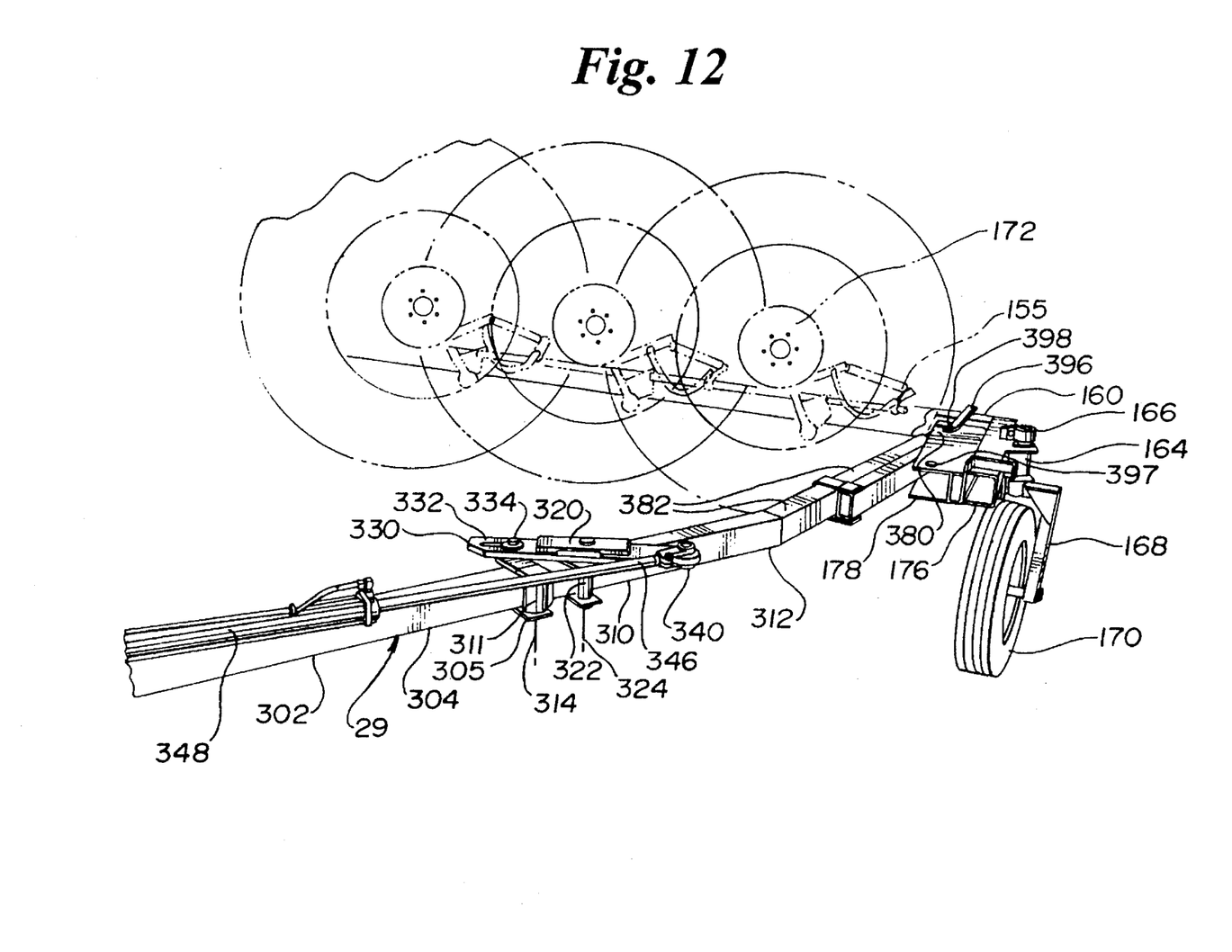
FIG. 12 is a fragmentary perspective view, similar to that of FIG. 7, seen from the front and showing the left side in narrow deployment.
Figure 13:
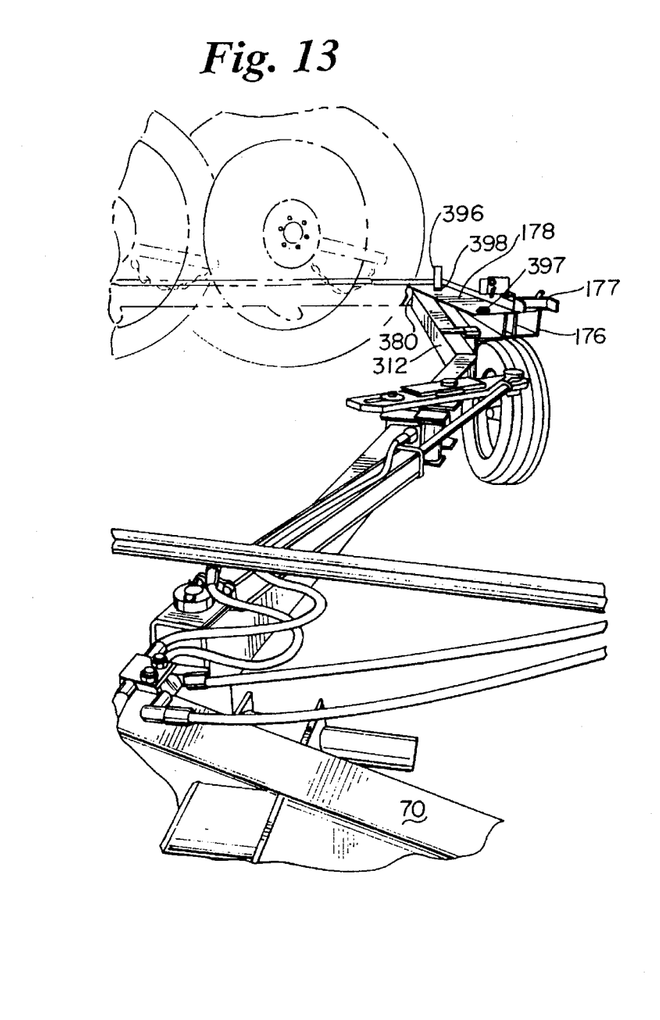
FIG. 13 is a fragmentary perspective view, similar to that of FIG. 10, showing left side in narrow deployment and viewed from just to the right of the primary frame.

Referring to FIGS. 4, 7, 10 and 11, the end 206 of the inboard arm 202 is attached to an intermediate position on the tongue 70 so as to accommodate angular motion in two dimensions. Specifically, a pivot pin 250 is carried in an orientation generally horizontal and generally parallel to the longitudinally extending tubular spine 72 of the primary frame 22 by a pivot housing 252. Optionally, this pivot pin 250 may also move a few inches forward and backwards, as shown in FIG. 11. At the rearward terminus of the pivot pin 250 is a pivot connection 254 to the end 206 of the inboard arm 202. The pivot connection 254 is generally perpendicular to the pivot pin 250 and tends toward a generally vertical orientation but can accommodate substantial deviation from its typical vertical orientation in response to flexing caused by travel over rough field terrain or vertical motion at the far end of the deployment spreader assembly 28.

The end 280 of the outboard arm 212 is attached to the connector frame 158 at an outboard or rearmost position on that connector frame 158. The end 280 is telescopic with the outboard arm 212. Specifically, the end 280 is the projecting terminus of an interior tube 281 telescopically inserted and slidable within an exterior sleeve which is outboard of bend 282. Bend 282 functions to avoid wheel rakes of the right bank of wheel rakes 152. As explained earlier, the connector frame 158 is pivotally attached to the outboard end frame 156 by a horizontal pivot. A control arm 290 is pivotally attached, at a first end 292, to the inboard or forward side of the sleeve, intermediate the bend 282 and the end 280. At the second end 294, the control arm 290 is reversibly pivotally attached to the connector frame 158 by removable pivot pin 296 at a plurality of selectable positions arrayed along the connector frame 158, inboard or ahead of the end 280 of the outboard arm 212. Preferably, two selectable vertical pivot attachment positions 297 and 298 are provided on the connector frame 158. Selection of the inboard or forward positioned pivot attachment 297 for the control arm 290 holds the right secondary frame 24 at a more open deployed position, thereby allowing a wider portion of a field to be raked. Selection of the outboard or rearward positioned pivot attachment 298 for the control arm 290 holds the right secondary frame 24 at a slightly closed deployed position, thereby allowing a slightly narrower portion of a field to be raked.

The left deployment spreader assembly 29 is a mirror image of the right deployment spreader assembly 28. The two deployment spreader assemblies 28 and 29 preferably function independently from each other, such that either one or both may be deployed or retracted. Briefly, the left deployment spreader assembly has a first or inboard arm 302 having a first end 304 and a second end 306. The first end 304 of the inboard arm 302 has a tab 305 which is pivotally attached to a tab 311 at the first end 310 of a second or outboard arm 312 at a first vertical pivot 314. An elbow member 320 is also pivotally attached to a second tab 322 on the outboard arm 312 through a second vertical pivot 324. The second tab 322 is spaced longitudinally apart from the first tab 311 at the first end 310 of the outboard arm 312. The second vertical pivot 324 is situated at an intermediate point on the elbow member 320. At a first end 330 of the elbow member 320 is a slot 332 extending generally longitudinally on the elbow member 320. Captured in the slot 332 is a lug 334 projecting vertically and upward from adjacent the first end 304 of the inboard arm 302. Lug 334 moves longitudinally, with respect to the elbow member 320, within slot 332 as the left deployment spreader assembly 29 operates. When the inboard arm 302 and the outboard arm 312 are positioned generally parallel to each other, as when the left secondary frame 26 of rake 20 is in the transport position, the lug 334 resides within the slot 332 at a location toward second pivot 324. When, as shown in FIGS. 4, 5, and 6, the inboard arm 302 and outboard arm 312 are positioned at roughly right angles to each other, as when the right secondary frame is in transition, half way toward being deployed or retracted, the lug 334 is positioned within the slot 332 closer to the first end 330 of the elbow member 320. When the inboard arm 302 and outboard arm 312 are positioned in a roughly co-linear relationship to each other, as shown in FIGS. 7, 8, 9 and 10, when the left secondary frame is fully deployed, the lug 334 is positioned within the slot 332 closer to the second pivot 324 than to the first end 330 of the elbow member 320.

The opposite end 340 of the elbow member 320 is pivotally connected to the terminal clevis of a hydraulic ram 346 driven by a hydraulic cylinder 348 which in turn is pivotally attached at an intermediate point 350 on the inboard arm 302. From an initial retracted position, as depicted in FIGS. 2 and 3, hydraulic extension of the ram 346 from the cylinder 348 moves the end 340 of the elbow member 320, forcing the outboard arm 312 to pivot about the first vertical pivot 314. During this initial motion, the end 340 of the elbow member 320 is angularly disposed to and situated slightly outboard from the outboard arm 312. As the extension motion continues, the end 340 of the elbow member 320 moves outboard and reorients slightly, while the outboard arm 312 beneath it moves outboard and reorients significantly, such that it becomes temporarily parallel to the elbow member 320, as shown in FIGS. 4, 5, and 6. As the extension motion is completed, the outboard arm 312 moves from generally parallel and to a new angular relationship with the elbow member 320. Finally, with the outboard arm 312 generally coaligned with the inboard arm 302, the end 340 of the elbow member 320 resides in front of the outboard arm 312 and further extension of the hydraulic ram and cylinder 346 and 348 tends to be limited by abutment of the ends 304 and 310 of the arms 302 and 312 near the first pivot 314, as shown in FIGS. 8, 9 and 10. In effect, the elbow member 320 tends to lock the inboard arm 302 and the outboard arm 312 in a generally co-aligned and fully extended relationship, corresponding to a fully deployed left secondary frame 26. This locking capability is due to a near linear geometry, including a slight overcenter relationship, between the first pivot 314, the second pivot 324 and the lug 334 within slot 332. Another significant feature of the deployment spreader assembly 29 is the relatively short travel (i.e. extension or retraction) needed between the hydraulic ram and cylinder 346 and 348 respectively. This feature saves both manufacturing cost and operating cost in reducing the weight of rake 20.

Referring to FIGS. 4, 7, 10 and 11, the end 306 of the inboard arm 302 is attached to an intermediate position on the tongue 70 so as to accommodate angular motion in two dimensions. Specifically, a pivot pin 350 is carried in an orientation generally horizontal and generally parallel to the longitudinally extending tubular spine 72 of the primary frame 22 by a pivot housing 352. Optionally, this pivot pin 350 may also move a few inches forward and backwards, as shown in FIG. 11. At the rearward terminus of the pivot pin 350 is a pivot connection 354 to the end 306 of the inboard arm 302. The pivot connection 354 is generally perpendicular to the pivot pin 350 and tends toward a generally vertical orientation but can accommodate substantial deviation from its typical vertical orientation in response to flexing caused by travel over rough field terrain or vertical motion at the far end of the deployment spreader assembly 29.

The end 380 of the outboard arm 312 is attached to the connector frame 178 at an outboard or rearmost position on that connector frame 178. The end 380 is telescopic with the outboard arm 312. Specifically, the end 380 is the projecting terminus of an interior tube 381 telescopically inserted and slidable within an exterior sleeve which is outboard of bend 382. Bend 382 functions to avoid wheel rakes of the right bank of wheel rakes 172. As explained earlier, the connector frame 178 is pivotally attached to the outboard end frame 176 by a horizontal pivot. A control arm 390 is pivotally attached, at a first end 392, to the inboard or forward side of the sleeve, intermediate the bend 382 and the end 380. At the second end 394, the control arm 390 is reversibly pivotally attached to the connector frame 178 by removable pivot pin 396 at a plurality of selectable positions arrayed along the connector frame 178, inboard or ahead of the end 380 of the outboard arm 312. Preferably, two selectable vertical pivot attachment positions 397 and 398 are provided on the connector frame 178. Selection of the inboard or forward positioned pivot attachment 397 for the control arm 390 holds the left secondary frame 26 at a more wide open deployed position, thereby allowing a wider portion of a field to be raked. Selection of the outboard or rearward positioned pivot attachment 398 for the control arm 390 holds the left secondary frame 26 at a slightly closed deployed position, thereby allowing a slightly narrower portion of a field to be raked.

Operation

The function of the present invention may be understood by first considering deployment of the right secondary frame 24 from a transport condition. Hydraulic fluid under pressure is applied to cylinder 248 so as to cause ram 246 to extend. This pushes end 240 of the elbow member 230 rearward and outboard. However, the force is transmitted by the elbow member to the second vertical pivot 224 and the lug 234 in slot 232. This in turn causes outboard arm 212 to pivot relative to inboard arm 202 about first vertical pivot 214. However, because the end 206 is pivotally held in position along the primary frame 22 and because the control arm 290 and telescopic end 280, in combination with the selected wide or narrow pivot connection 297 or 298 of the pivoting secondary frame 24, define a particular pathway which must be followed, then both arms 202 and 212 begin to move in concert and initiate the deployment of the right secondary frame 24. It should be particularly noted that connection of control arm 290 to the wide pivot connection 297 results in a distinctly different pathway than that resulting from connection to narrow pivot connection 298. As noted earlier, the deployment spreader assembly also slides outboard, away from the primary frame 22, along transport support bracket 78 and down ramp 80. The deployment continues, typically with the caster wheel 150 both pivoting and rolling while supporting the frame 24. As the maximum extension is achieved and arms 202 and 212 become coaligned and the ends 210 and 204 abut, the pivots 214, 224 and lug 234 in slot 232 briefly pass through a geometric linear alignment and then enter an over center relationship, which serves to effectively lock the arms 202 and 212 in position. Retraction is effectively a reversal of the process, beginning with unlocking the arms 202 and 212 from the overcenter condition by hydraulic retraction of the ram 246 and ultimately completed with the deployment spreader assembly 28 sliding up ramp 80 and across bracket 78. If appropriate, the outboard frame 156 can be temporarily attached to the primary frame 22. Operation of the left deployment assembly is the mirror image.

The present invention enables a relatively light frame to form the implement 20, saving in manufacturing costs and weight relative to the heavier frame required in the absence of the present invention. The frame of the implement 20 gains the ability to flex in response to varying field surfaces due to the relatively light primary and secondary frames 22, 24, and 26 and the ability of the deployment spreader assembly 28 to accommodate angular motion in two dimensions at each end.

Because numerous modifications may be made of this invention without departing from the spirit thereof, the scope of the invention is not to be limited to the single embodiment illustrated and described. Rather, the scope of the invention is to be determined by appended claims and their equivalents.

What is claimed is:

1. A folding hay rake, comprising:

a primary frame, having a forward end for attachment to a towing vehicle and a wheel supported rear end opposite the forward end;

a left secondary frame pivotally attached to the primary frame adjacent the rear end;

a right secondary frame pivotally attached to the primary frame adjacent the rear end;

a left deployment spreader assembly having a first left arm pivotally attached to the primary frame at a position spaced apart from the pivotal attachment of the left secondary frame, a second left arm pivotally connected to the first left arm opposite the connection to the primary frame and connected to the left secondary frame at a position spaced apart from the pivot connection of the left secondary frame to the primary frame, and a left elbow member slidably and pivotally attached to the first left arm and pivotally attached to the second left arm, and a hydraulic actuator to drive the left elbow member to pivot the second left arm relative to the first left arm; and a right deployment spreader assembly having a first right arm pivotally attached to the primary frame at a position spaced apart from the pivotal attachment of the right secondary frame, a second right arm pivotally connected to the first right arm opposite the connection to the primary frame and connected to the right secondary frame at a position spaced apart from the pivot connection of the right secondary frame to the primary frame, and a right elbow member slidably and pivotally attached to the first right arm and pivotally attached to the second right arm, and a hydraulic actuator to drive the right elbow member to pivot the second right arm relative to the first right arm.

2. The folding hay rake of claim 1 and wherein the left and right secondary frames include caster wheels.

3. The folding hay rake of claims 1 and wherein the three pivots between the first and second arms, the elbow members and the second arms, and the elbow members and the first arms of the right and left deployment spreaders are in an overcenter relationship when the first and second arms are co-aligned.

4. The folding hay rake of claim 1 and wherein the right and left secondary frames each have a plurality of pivotal attachments selectable for pivotal attachment of the secondary arms.

5. The folding hay rake of claim 1 and wherein the primary frame includes a transport bracket positioned to support the first and second arms of each of the deployment spreader assemblies when the arms are in a parallel relationship.

* * * * *